(12) United States Patent
Ito et al.

(10) Patent No.: US 6,467,005 B1
(45) Date of Patent: Oct. 15, 2002

(54) SYSTEM FOR CONNECTING DRIVE UNIT FOR HOST APPARATUS

(75) Inventors: Tamotsu Ito, Ayase; Yukari Sakuramoto; Eiji Ikeda, both of Yokohama, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/229,832

(22) Filed: Jan. 13, 1999

(30) Foreign Application Priority Data

Jan. 14, 1998 (JP) .......................................... 10-005417

(51) Int. Cl.[7] .............................................. G06R 13/14
(52) U.S. Cl. ...................... 710/130; 711/118; 713/201; 369/47.13; 380/23
(58) Field of Search .......................... 710/130; 711/118; 713/201; 369/47.13; 380/23

(56) References Cited

U.S. PATENT DOCUMENTS

| | | | | |
|---|---|---|---|---|
| 5,253,295 A | * | 10/1993 | Saada et al. ................... | 380/23 |
| 5,659,613 A | * | 8/1997 | Copeland et al. .............. | 380/3 |
| 5,802,559 A | * | 9/1998 | Bailey .......................... | 711/118 |
| 6,021,495 A | * | 2/2000 | Jain et al. .................... | 713/201 |
| 6,137,952 A | * | 10/2000 | Hogan .......................... | 386/94 |
| 6,167,551 A | * | 12/2000 | Nguyen et al. .............. | 714/770 |
| 6,256,391 B1 | * | 7/2001 | Ishiguro et al. ............. | 380/203 |
| 6,266,480 B1 | * | 7/2001 | Ezaki et al. ................... | 386/94 |
| 6,266,482 B1 | * | 7/2001 | Yagasaki et al. .............. | 386/94 |
| 6,288,989 B1 | * | 9/2001 | Ro et al. .................. | 369/47.13 |

* cited by examiner

Primary Examiner—Jeffrey Gaffin
Assistant Examiner—Abdelmoniem Elamin
(74) Attorney, Agent, or Firm—Antonelli, Terry, Stout & Kraus, LLP

(57) ABSTRACT

A drive unit connecting system for connecting a drive unit for an optical information/data recording medium to a reproducing apparatus serving as a destined host apparatus through the medium of a general-purpose interface is designed to inhibit normal operation when the drive unit is connected to other apparatus than the destined one without employing expensive IC chips dedicated for authentication. The drive unit connecting system enables a drive unit to be connected to only a proper reproducing apparatus through a general-purpose interface by performing software-based processing on either one of command(s) or parameter(s) or alternatively on both of the command(s) and the parameter (s).

4 Claims, 3 Drawing Sheets

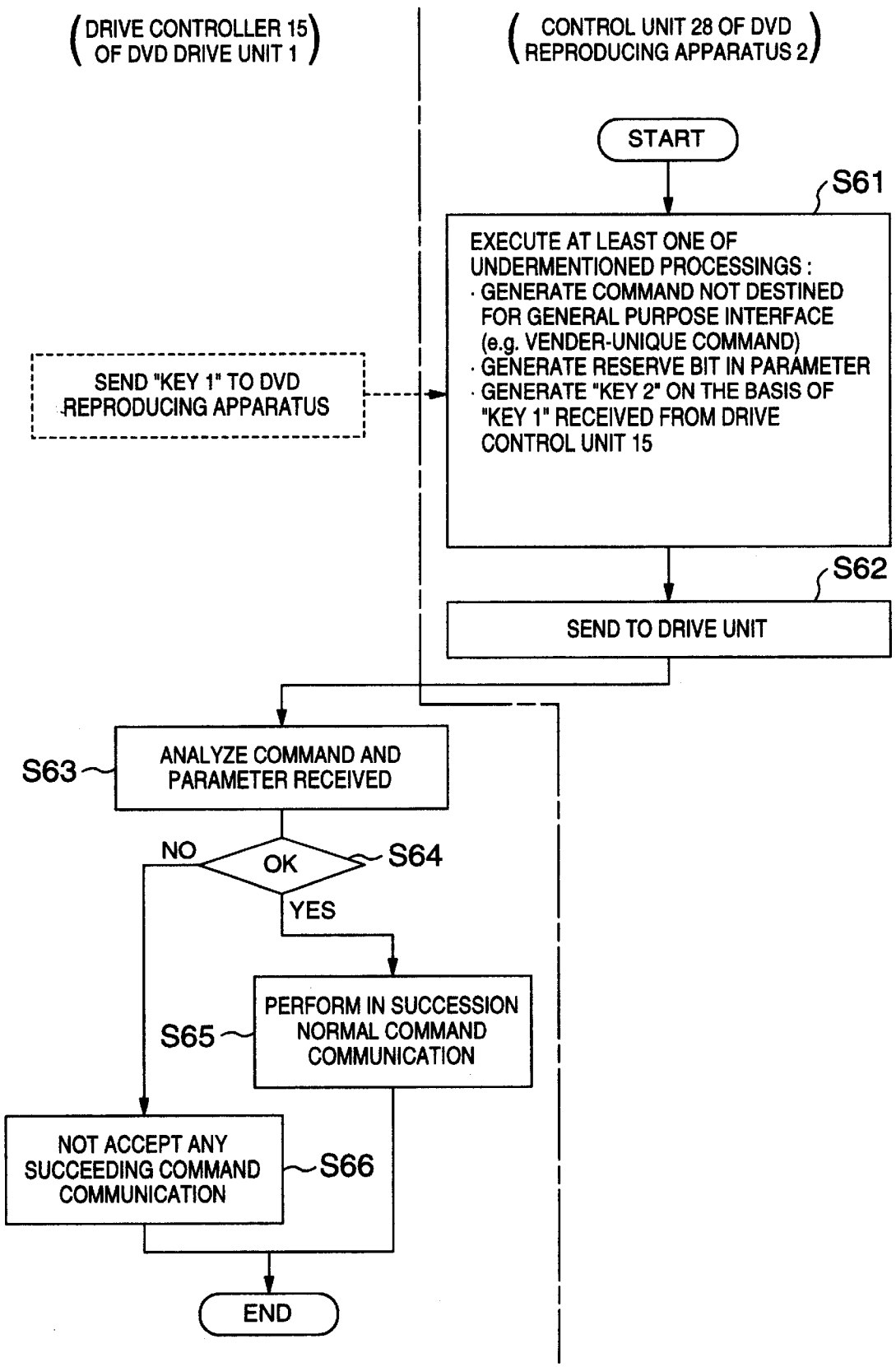

SYSTEM FOR CONNECTING DRIVE UNIT FOR HOST APPARATUS

BACKGROUND OF THE INVENTION

The present invention relates in general to a system for connecting a drive unit to a host apparatus. More particularly, the invention is concerned with a system for connecting a drive unit for an optical information/data recording medium or the like capable of recording digital video/audio information or data to a reproducing apparatus.

SUMMARY OF THE INVENTION

As an optical information/data recording medium capable of recording digital video/audio information or signals, there is known, for example, a digital video disk or digital versatile disk (herein-after referred to as DVD in abbreviation). In the following description, it is assumed that the present invention is directed to a system for connecting a DVD drive unit for an optical disk to a DVD reproducing apparatus by using a general-purpose interface of connector-connection type. It should however be understood that this is only for the purpose of illustration. The present invention is never restricted to the system for the DVDs.

As the drive unit connecting system such as mentioned above, it is conceivable to incorporate a first authentication-dedicated IC chip as a part of a drive controller of the DVD drive unit while incorporating a second authentication-dedicated IC chip capable of establishing authenticity through cooperation with the first authentication-dedicated IC chip in a control unit of a DVD reproducing apparatus, wherein upon connection of the DVD drive unit to the DVD reproducing apparatus through the medium of a general-purpose interface such as ATA interface (At attachment interface), SCSI (Small Computer System Interface) or the like in a connecter-like fashion, authenticity of the DVD drive unit and/or that of the DVD reproducing apparatus is confirmed through cooperation of the first and second authentication-dedicated IC chips by checking enciphered information, and only when the authenticity is established, the DVD drive controller (i.e., controller of the DVD drive unit) is allowed to be electrically connected to the control unit of the DVD reproducing apparatus. Owing to the arrangement mentioned above, only the DVD drive unit and the DVD reproducing apparatus which are authentically allowed to be interconnected can be electrically and mechanically connected to each other.

However, in that case, there arises necessity for mounting or packing the expensive authentication-dedicated IC chips in both the controller of the DVD drive unit and the control unit of the DVD reproducing apparatus, respectively, which will of course lead to increase of manufacturing cost of the optical disk reproduction system as a whole, giving rise to a problem. Parenthetically, a combination of the DVD drive unit and the DVD reproducing apparatus is herein referred to as the optical disk reproduction system.

It is therefore an object of the present invention to provide a drive unit connecting system which can inhibit normal operation when a drive unit is connected to a system other than a destined or authenticated one without the need for employing the expensive IC chips dedicated for the authentication.

Another object of the present invention is to provide a drive unit connecting system for connecting a drive unit for an optical information/data recording medium to a reproducing apparatus serving as a destined or authenticated host apparatus through the medium of a general-purpose interface, which system is capable of inhibiting normal operation when the drive unit is connected to a reproducing apparatus other than the destined one without the need for employing expensive IC chips for the authentication.

In view of the above and other objects which will become apparent as the description proceeds, there is provided according to an aspect of the present invention a drive unit connecting system for connecting a drive unit to a host apparatus by using a general-purpose interface, which system is so arranged as to enable the drive unit to be connected to the host apparatus by performing software-based processing on either command(s) or parameter(s) or alternatively on both of the command(s) and the parameter(s).

Further, according to another aspect of the invention, there is provided a drive unit connecting system for connecting a drive unit to a host apparatus by using a general-purpose interface, wherein in the host apparatus, parts or all of proper commands and parameters are subjected to at least one processing selected from a group consisting of a processing for inverting each bit value (bit value 1→0, bit value 0→1), less significant bit/more significant bit (e.g. least significant bit (LSB) and most significant bit (MSB)) inversion processing, addition processing for adding N (a given value) to the command(s) and the parameter(s), respectively, subtraction processing for subtracting N (a given value) from the command(s) and the parameter(s), respectively, and a processing for changing sequence in the parameter is executed with resultant command(s) and parameter(s) resulting from the processing as executed being sent to the drive unit, and wherein the drive unit is so arranged that processing reverse to that executed in the host apparatus is performed on the command(s) and the parameter(s) received from the host apparatus, to thereby allow the drive unit to be connected to the host apparatus only for the proper command(s) and parameter(s).

Furthermore, according to yet another aspect of the invention, there is provided a drive unit connecting system for connecting a drive unit to a host apparatus by using a general-purpose interface, wherein at least one processing selected from a group consisting of a processing for generating command(s) which is not prescribed for the general-purpose interface, a processing for generating reserve bit(s) in parameter(s) and a processing for generating second key information (KEY #2) on the basis of first key information (KEY #1) which has been sent from the drive unit and which differs from the second key information (KEY #2) is executed in the host apparatus with result of the processing as executed being sent to the drive unit, and wherein in the drive unit, the command(s) and the parameter(s) as received are analyzed, to thereby allow the drive unit to be connected to the host apparatus only when matching has been found as a result of the analysis.

In a preferred mode for carrying out the invention, such arrangement may be adopted that execution of the processing(s) can be changed at a desired time point which depends on the absolute clock time, version of the drive unit or the like.

Additionally, according to still another aspect of the invention, there is provided a drive unit connecting system for connecting a DVD drive unit for an optical information/data recording medium to a DVD reproducing apparatus by using a general-purpose interface, wherein the DVD drive unit is comprised of a reading unit for reading information recorded on an optical information/data recording medium, and a DVD drive controller for performing control such that video/audio data can be extracted from the information read out by the reading unit, and wherein the DVD reproducing apparatus is comprised of a work memory for storing the video/audio data supplied from the DVD drive controller, a video/audio output unit for outputting the video/audio data, a decoder unit for reading out the video/audio data stored in the work memory for converting the video/audio data as read out into desired video/audio data to thereby output the desired video/audio data to the video/audio output unit, and a control unit for controlling the DVD drive controller, the work memory and the decoder unit, wherein connection of the DVD drive unit to the DVD reproducing apparatus is enabled through software-based processing(s) performed on either command(s) or parameter(s) or alternatively on both of the command(s) and the parameter(s).

In addition, according to a further aspect of the invention, there is provided a drive unit connecting system for connecting a DVD drive unit for an optical information/data recording medium to a DVD reproducing apparatus by using a general-purpose interface, wherein the DVD drive unit is comprised of a reading unit for reading information recorded on the optical information/data recording medium, and a DVD drive controller for performing control such that video/audio data can be extracted from the information read out by the reading unit, and wherein the DVD reproducing apparatus is comprised of a work memory for storing the video/audio data supplied from the DVD drive controller, a video/audio output unit for outputting video/audio data, a decoder unit for reading out the video/audio data stored in the work memory for converting the video/audio data as read out into desired video/audio data, to thereby output the desired video/audio data to the video/audio output unit, and a control unit for controlling the DVD drive controller, the work memory and the decoder unit, wherein in the DVD reproducing apparatus, parts or all of proper command(s) and parameter(s) is subjected to at least one processing selected from a group consisting of a processing for inverting each bit value (bit value 1→0, bit value 0→1), less significant bit/more significant bit (LSB and MSB) inversion processing, addition processing for adding N (a given value) to the command(s) and the parameter(s), respectively, subtraction processing for subtracting N (a given value) from the command(s) and the parameters), respectively, and a processing for changing sequence in the parameter is executed with resultant command(s) and parameter(s) from the processing being sent to the DVD drive unit for the optical information/data recording medium, and wherein in the DVD drive unit, processing reverse to that executed in the DVD reproducing apparatus is performed on the command(s) and the parameter(s) received from the DVD reproducing apparatus to thereby allow the DVD drive unit to be connected to the DVD reproducing apparatus only for the proper command(s) and parameter(s).

Furthermore, according to a yet further aspect of the invention, there is provided a drive unit connecting system for connecting a DVD drive unit for an optical information/data recording medium to a DVD reproducing apparatus by using a general-purpose interface, wherein the DVD drive unit is comprised of a reading unit for reading information recorded on the optical information/data recording medium, and a DVD drive controller for performing control such that video/audio data can be extracted from the information read out by the reading unit, and wherein the DVD reproducing apparatus is comprised of a work memory for storing the video/audio data supplied from the DVD drive controller, a video/audio output unit for outputting video/audio data, a decoder unit for reading out the video/audio data stored in the work memory for converting the video/audio data as read out into desired video/audio data, to thereby output the desired video/audio data to the video/audio output unit, and a control unit for controlling the DVD drive controller, the work memory and the decoder unit, wherein at least one processing selected from a group consisting of a processing for generating command(s) which are not prescribed for the general-purpose interface, a processing for generating reserve bits in parameter(s) and a processing for generating second key information (KEY #2) on the basis of first key information (KEY #1) which has been sent from the DVD drive unit and which differs from the second key information (KEY #2) is executed in the DVD reproducing apparatus with result of the processing as executed being sent to the drive unit, and wherein in the DVD drive unit, the command (s) and the parameter(s) as received are analyzed to thereby allow the DVD drive unit to be connected to the DVD reproducing apparatus only when matching has been found as a result of the analysis.

In another preferred mode for carrying out the invention, such arrangement may be adopted that execution of the processing(s) can be changed at a desired time point in dependence on the absolute clock time, version of the drive unit or the like.

As will be appreciated from the foregoing, by virtue of the arrangements taught by the present invention as described above, there can be realized the drive unit connecting system which is capable of connecting the drive unit to the host system by using a general-purpose interface without resorting to the expensive authentication-dedicated IC chips and which can render it impossible for the drive unit to operate normally when an apparatus other than the authentic or proper one is connected thereto through the medium of the general-purpose interface. In other words, only the combination of a specific drive unit and a host apparatus incorporating a specific decoder unit which is proper to the drive unit allows the drive unit to operate normally. Besides, because the general-purpose interface is employed, functions (e.g. range of support commands and preset parameters, etc.) as well as performance (data transferring rate, prefetching/buffering rate, etc.) can be changed or modified in dependence on the host apparatuses (decoder units) which are designed to be connected with one and the same drive unit.

Furthermore, owing to the arrangement of the drive unit connecting system for connecting the DVD drive unit to the DVD reproducing apparatus by using the general-purpose interface, normal operation of the drive unit is rendered impossible when other apparatus than the proper one is connected to the general-purpose interface without need for resorting to the expensive authentication-dedicated IC chips. To say in another way, only the combination of a specific DVD drive unit and a DVD reproducing apparatus incorporating a specific decoder unit proper to the DVD drive unit can make the DVD drive unit operate normally. Additionally, because the general-purpose interface is employed, functions (e.g. range of support commands and preset parameters, etc.) as well as performance (data transferring rate, prefetching/buffering rate, etc.) can be altered or modified in dependence on the DVD reproducing apparatuses (decoder unites) which are designed to be connected with one and the same DVD drive unit.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which:

FIG. 3 is a view for illustrating a software-based processing procedure which allows only a DVD drive unit and a DVD reproducing apparatus paired duly to be interconnected through connector-connection type general-purpose interface according to the invention.

DESCRIPTION OF THE PREFERRED EMBODIMENTS

Figure 1:
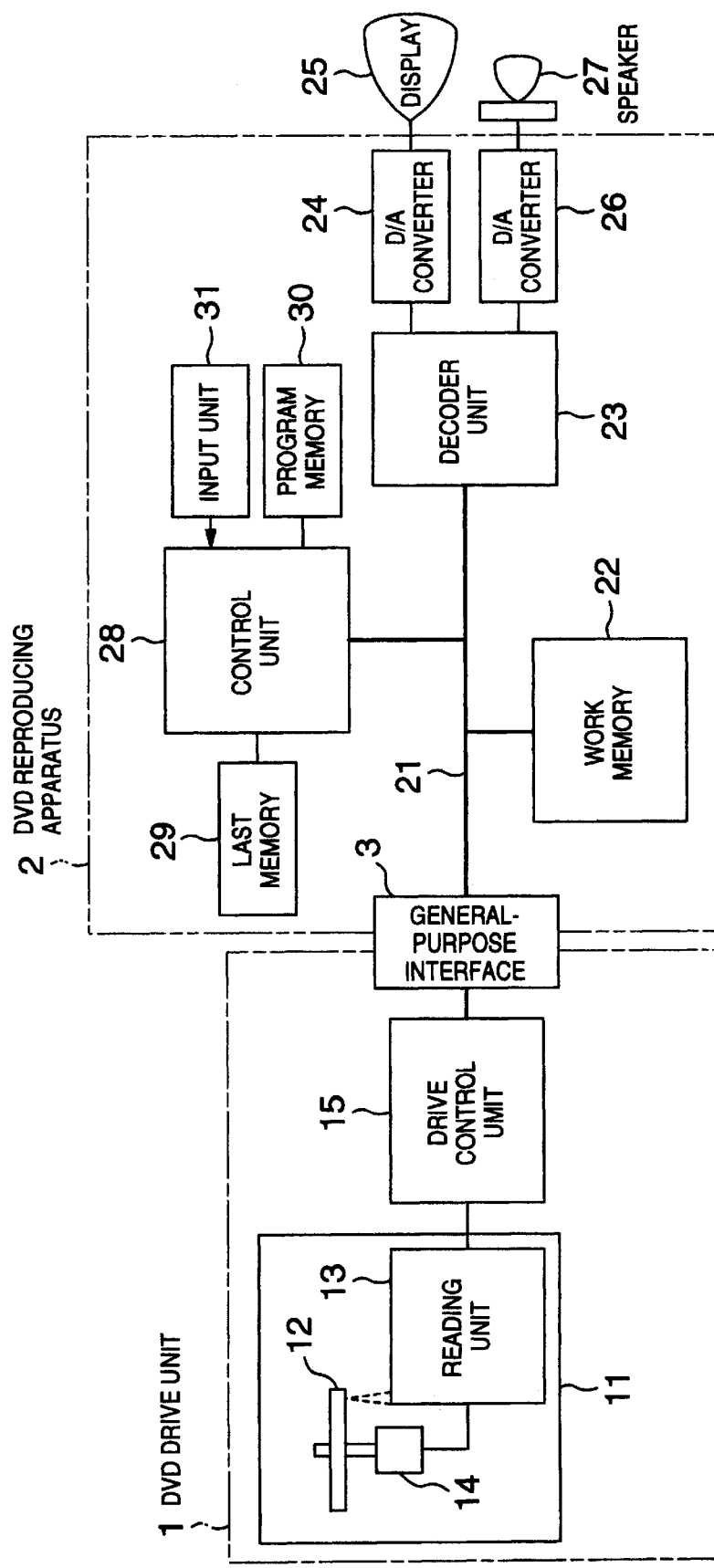
FIG. 1 is a schematic block diagram showing generally a whole arrangement of a reproducing system for an optical information/data recording medium (optical disk) in which a general-purpose interface is employed for the connection of a drive unit according to an embodiment of the present invention.

The present invention will be described in detail in conjunction with what is presently considered as preferred or typical embodiments thereof by reference to the drawings. In the following description, like reference characters designate like or corresponding parts throughout the several views. The following description will be directed to a DVD reproducing system as a typical one representative of a system to which the general-purpose interface according to the present invention can find application. It should however be understood that the invention is never limited to the DVD reproducing system.

FIG. 1 is a schematic block diagram showing generally a whole configuration or arrangement of a reproducing apparatus for an optical information/data recording medium (optical disk) in which a general-purpose interface according to an embodiment of the present invention is employed for connection of a DVD drive unit to a DVD reproducing apparatus, both cooperating to constitute a DVD reproducing system. More specifically, the reproducing apparatus for the optical information/data recording medium (DVD) according to an embodiment of the present invention is comprised of a digital versatile disk or digital video disk drive unit (hereinafter referred to simply as the DVD drive unit in abbreviation) 1 and a DVD reproducing apparatus 2 which are electrically interconnected through the medium of a connector-connection type general-purpose interface (e.g. ATA interface (AT Attachment Interface, SCSI (Small Computer System Interface), etc.) 3.

Referring to FIG. 1, the DVD drive unit 1 is comprised of a driving module 11 which is constituted by a reading unit 13 adapted to read out digital information recorded on an optical disk 12 onto a bus 21 of the DVD reproducing apparatus 2 by way of the general purpose interface 3 and a driving motor unit 14 for driving the optical disk and a pick-up and a DVD drive controller 15 constituted by a microcomputer which serves for controlling the read operation performed by the reading unit 13 and driving operation carried out by the driving motor unit 14 as well as electric connection of the DVD drive unit 1 with the DVD reproducing apparatus 2 through the connector-connection type general-purpose interface 3 designed for establishing mechanical and electrical interconnection between the DVD drive unit and the DVD reproducing apparatus in a connector-like fashion. At this juncture, it should also be added that the DVD drive controller 15 incorporates a mask read-only memory (mask ROM) or the like which stores a program for executing a connection processing to connect the DVD drive controller 15 to the DVD reproducing apparatus 2 through the medium of the general-purpose interface 3.

On the other hand, the DVD reproducing apparatus 2 is comprised of a work memory 22 for recording or storing digital information made available from the DVD drive unit 1 by way of the general-purpose interface 3, a decoder unit 23 for decoding compressed video/audio data as stored in the work memory 22 by using, for example, MPEG-2 (Moving Picture coding Exerts Group 2) or the like to thereby convert into the former expanded video/audio data, a digital-to-analog or D/A converter 24 for converting a digital video signal resulting from the decoding performed by the decoder unit 23 into an analog video signal, a video output unit 25 constituted by a convenient display device or the like connected to the output side of the D/A converter 24, a D/A converter 26 for converting a digital audio signal resulting from the decoding by the decoder unit 23 into an analog audio signal, an audio output unit 27 constituted by a speaker or the like connected to the output side of the D/A converter 26, a control unit 28 which is constituted by a microcomputer such as an SH microcomputer or the like and which is designed for performing control for the electric connection with the DVD drive unit 1 by way of the general-purpose interface 3 mounted in a connector-like fashion connection as well as control for the work memory 22, the decoder unit 23 and a last memory 29 and additionally designed for fetching commands and data inputted through an input facility or unit (hereinafter referred to as the input unit) 31, the last memory 29 constituted by a rewritable nonvolatile memory such as an EEPROM (Electrically Erasable Programmable Read-Only Memory), a flash memory or the like for reading out from the work memory 22 for storage therein the information which should not be lost such as algorithm or the like for modifying or altering the connection processing procedure for establishing electric connection between the DVD drive unit 1 and the DVD reproducing apparatus 2 through the medium of the general-purpose interface 3, a program memory (mask ROM) 30 for storing a program or programs for the controls performed by the control unit 28, the input unit 31 constituted by a remote control unit, a keyboard or the like for inputting output states of (or output conditions for) the video output unit and the audio output unit and designating reproducing position, and the bus 21 for interconnecting at least the general-purpose interface 3, the work memory 22, the decoder unit 23 and the control unit 28.

As is apparent from the foregoing description, in the optical disk or DVD reproducing apparatus according to the instant embodiment of the invention, the DVD drive unit 1 and the DVD reproducing apparatus 2 are electrically interconnected through the connector-like connection by way of the general-purpose interface 3 (e.g. ATA Interface, SCSI or the like). Accordingly, the DVD drive unit 1 and the DVD reproducing apparatus 2 can be mechanically disconnected or separated from each other, which means however that the DVD drive unit 1 can possibly be connected mechanically and electrically to a given host apparatus such as personal computer or the like as well which is equipped with the general-purpose interface. Consequently, information recorded on an optical disk installed on the DVD drive unit 1 can be read out or rewritten or erased even by other unauthentic host apparatus without authorization, giving rise to a problem.

To cope with the problem mentioned above, it becomes necessary to take the measures for allowing only the DVD drive unit 1 and the DVD reproducing apparatus 2 paired duly to be mechanically and electrically interconnected. In this conjunction, it is conceivable to incorporate a first authentication-dedicated IC chip as a part of the DVD drive controller 15 of the DVD drive unit 1 while incorporating a second authentication-dedicated IC chip capable of establishing authenticity through cooperation with the first authentication-dedicated IC chip in the control unit 28 of the DVD reproducing apparatus 2, wherein upon connection of the DVD drive unit 1 to the DVD reproducing apparatus 2 in a connector-like fashion through the medium of the general-purpose interface such as ATA interface, SCSI or the like, authenticity of the DVD drive controller is confirmed through cooperation of both the first and second authentication-dedicated IC chips by checking cipher information, and only when the authenticity is established or confirmed, the DVD drive controller 15 is allowed to be electrically connected to the control unit 28. Owing to the arrangement mentioned above, only the DVD drive unit 1 and the DVD reproducing apparatus 2 that are paired duly can be disconnectably interconnected not only electrically but also mechanically.

However, in that case, there arises necessity for incorporating the expensive authentication-dedicated IC chips in both the DVD drive controller 15 of the DVD drive unit 1 and the control unit 28 of the DVD reproducing apparatus 2, respectively, which naturally leads to increase of manufacturing cost of the optical disk reproducing system as a whole.

Such being the circumstances, the concept of the invention incorporated in the instant embodiment thereof is to make it possible to interconnect only the DVD drive unit 1 and the DVD reproducing apparatus 2 that are duly paired through the connector connection by using the general-purpose interface by resorting to a software-based processing procedure without using the authentication-dedicated IC chips.

Figure 2:
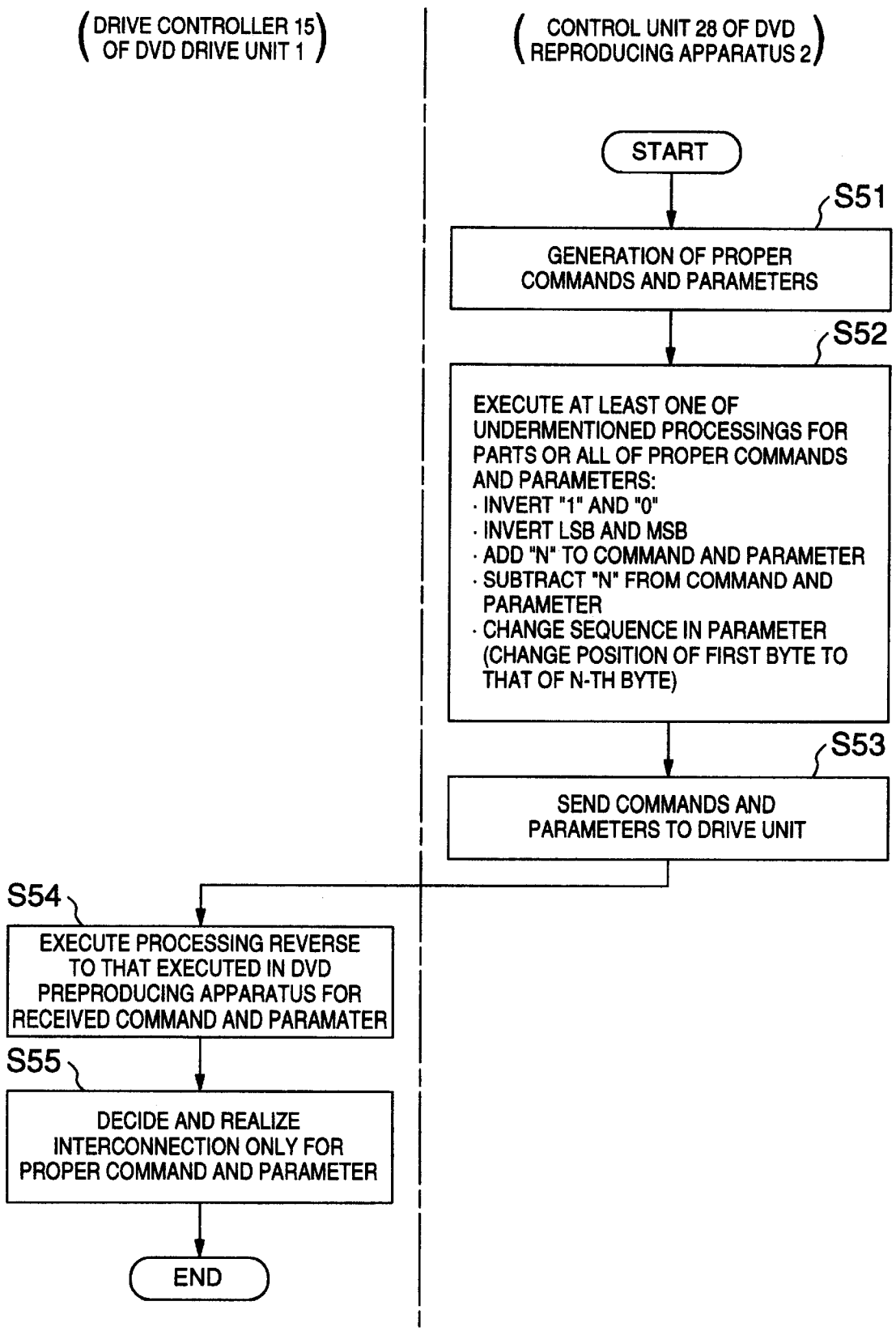
FIG. 2 is a view for illustrating a software-based processing procedure which allows only a DVD drive unit and a DVD reproducing apparatus paired duly to be interconnected through connector-connection type general-purpose interface according to the invention.

Now referring to FIGS. 2 and 3, description will be directed to a software-based processing procedure which allows only the DVD drive unit 1 and the DVD reproducing apparatus 2 that are paired duly to be interconnected through the connector-connection type general-purpose interface. In this conjunction, it is presumed that a program(s) for the software-based processing procedure is permanently stored in the DVD drive controller 15 of the DVD drive unit 1 and the control unit 28 or the program memory 30 or the video output unit 25 of the DVD reproducing apparatus 2.

Further, it should also be added that the software-based processing procedure is generally so designed as to apply some gimmick to the general-purpose interface driver for making decision as to whether a desired decoded signal can be derived or not.

More specifically, referring to FIG. 2, the control unit 28 of the DVD reproducing apparatus 2 generates proper commands and parameters for the decoder unit 23 in a step S51 and makes the decoder unit 23 execute at least one of the processings mentioned below for some or all of the proper commands and the parameters in a step S52.

As a first processing, each bit value is inverted (bit value 1→0, bit value 0→1), respectively.

As a second processing, a less significant bit (e.g. lest significant bit or LSB) and a more significant bit (e.g. most significant bit or MSB) are inverted, respectively.

As a third processing, a given value N (where N represents any numerical value which is not limited to integer) is added to the command and the parameter, respectively.

As a fourth processing, a given value N (where N represents any numerical value which is not limited to integer) is subtracted from the command and the parameter, respectively.

As a fifth processing, sequence of the parameter is changed (e.g. first byte is placed at the N-th byte position).

Subsequently, in a step S53, the control unit 28 of the DVD reproducing apparatus 2 sends the command(s) and the parameter(s) processed by the decoder unit 23 to the DVD drive controller 15 by way of the general-purpose interface 3.

The DVD drive controller 15 of the DVD drive unit 1 then executes processing(s) reverse to that or those executed in the DVD reproducing apparatus 2 on the commands and the parameters received by way of the general-purpose interface 3 in a step S54. As a result of this, the DVD drive controller 15 can perform communication with the DVD reproducing apparatus 2 by way of the general-purpose interface 3 only when the command(s) and the parameter(s) as received are recognized as the proper command(s) and the proper parameter(s), respectively, in a step S55. Unless the command and the parameter as received are proper ones, communication with the DVD reproducing apparatus 2 is rendered impossible.

Now referring to FIG. 3, the control unit 28 of the DVD reproducing apparatus 2 makes the control unit 28 execute at least one of the undermentioned processings for the decoder unit 23 in a step S61.

A first processing is to generate a command not specified for the general purpose (e.g. render-unique command).

A second processing is to generate reserve bit in the parameter.

A third processing is to generate a key "KEY #2" on the basis of a key "KEY #1" (any information capable of serving as the key) sent from the DVD drive controller 15.

Subsequently, the control unit 28 of the DVD reproducing apparatus 2 sends the command and the parameter resulting from the processing(s) executed by the decoder unit 23 to the DVD drive controller 15 by way of the general-purpose interface 3 in a step S62.

The DVD drive controller 15 of the DVD drive unit 1 then analyzes the command and the parameter received by way of the general-purpose interface 3 in a step S63. As a result of this, when matching is found in a step S64 (i.e., when the decision step S64 results in affirmation "YES"), then command communication can be carried out normally between the DVD reproducing apparatus 2 and the general-purpose interface 3 in a step S65 et seq. On the other hand, unless matching is found in the step S65 (i.e., when the decision step S64 results in negation "NO"), the DVD drive controller 15 does not afford any further the command communication with the DVD reproducing apparatus 2 via the general-purpose interface 3, making it impossible to send information or data to the DVD reproducing apparatus 2 from the DVD drive unit 1.

As is described above, it is possible to interconnect only the DVD drive unit 1 and the DVD reproducing apparatus 2 that are duly paired through the medium of the connector-connection type general-purpose interface by resorting to software-based processing procedure without using the expensive authentication-dedicated IC chip.

Parenthetically, normal operation of the DVD drive unit 1 is rendered impossible when other improper apparatus is connected to the general-purpose interface 3.

To say in another way, only the proper combination of a specific DVD drive unit 1 and a DVD reproducing apparatus 2 incorporating a specific decoder unit can render the DVD drive unit 1 to operate normally.

Besides, because the general-purpose interface 3 is employed, functions (range of support commands and preset parameter, etc.) as well as performance (data transferring rate, prefetching/buffering rate, etc.) can be changed in dependence on the DVD reproducing apparatus 2 serving as the host apparatuses (decoder unites) which are designed for connection with one and the same DVD drive unit 1.

Thus, once the state has been established in which the DVD drive controller 15 can communicate with the DVD reproducing apparatus 2 through the medium of the general-purpose interface 3, the DVD drive controller 15 reads out the digital information recorded on the optical disk 12 in accordance with the control command supplied to the DVD drive controller 15 from the control unit 28 of the DVD reproducing apparatus 2 by way of the general-purpose interface 3, whereon the digital information read out from the optical disk 12 is sent to the bus 21 of the DVD reproducing apparatus 2 via the general-purpose interface 3 to be stored in the work memory 22. On the other hand, the control unit 28 incorporated in the DVD reproducing apparatus 2 reads out the compressed video/audio data stored in the work memory 22, whereon the video/audio data are decoded in the decoder unit 23 by using, for example, MPEG-2 (Moving Picture coding Exerts Group 2) or the like to be thereby convert he former into expanded video/audio data, which is then converted into the analog video signal by the D/A converter 24 to be outputted from the video output unit 25. Accordingly, the digital audio signal resulting from the decoding by the decoder unit 23 is converted into an analog video signal by the D/A converter 26 to be outputted from the audio output unit 27.

Parenthetically, it should be mentioned that the control unit 28 of the DVD reproducing apparatus 2 controls the above-mentioned operations in accordance with a program stored in the program memory 30.

In the last memory 29 which is constituted by a nonvolatile memory, there may be stored by way of the general-purpose interface 3 interposed between the DVD drive unit 1 and the DVD reproducing apparatus 2 such algorithm or the like which is destined for altering or modifying the connection processing procedure described above at a desired time point (depending on the absolute clock time or version of the DVD drive unit 1). Thus, by reading out the algorithm or the like from the last memory 29 at a desired time point by the control unit 28 of the DVD reproducing apparatus 2 and the DVD drive controller 15, it is possible to alter the connecting procedure described above. It is to be noted that since the last memory 29 is rewritable as mentioned herein-before, the algorithm itself for altering or changing the connecting procedure can be rewritten.

In this conjunction, the information indicating the modification or alteration of the connecting procedure may be recorded on the optical information/data recording medium (optical disk) 12 such as a DVD RAM installed in the DVD drive unit 1. In that case, by reading out the information which commands alteration of the connecting procedure from the optical disk 12 set on the DVD drive unit 1, it is possible to realize alteration of the connecting procedure by the control unit 28 of the DVD reproducing apparatus 2 and the DVD drive controller 15.

Furthermore, there may be stored in the last memory 29 periodically or at a predetermined time interval or in response to predetermined operation of the input unit 31 (e.g. operation for turning off the power supply) the information concerning the optical disk for which the reproducing operation has been done, reproducing position information for enabling reproduction in continuation and the output states of (or output conditions for) the video output unit and the audio output unit. In that case, when the power supply is started after the turn-off, the information concerning the optical disk for which the reproducing operation has been done, reproducing position information for enabling reproduction in continuation and the output states (output conditions) for the video output unit and the audio output unit can be read out from the last memory 29 to be stored in the work memory 22, allowing thus the reproduction interrupted due to the power-off to be regained in continuation. By the way, the information concerning the output states (output conditions) for the video output unit and the audio output unit can be inputted with the aid of the input unit 31 such as the keyboard or the like.

Although the foregoing description has been directed to the interconnection of the DVD drive unit 1 and the DVD reproducing apparatus 2 via the general-purpose interface 3 through the software-based processing procedure, it should be understood that the teachings of the present invention can be applied in general to the interconnection between a drive unit and a host apparatus (decoder unit) in general via a given general-purpose interface.

As will be appreciated from the foregoing, according to the teachings of the invention incarnated in the illustrated embodiment, there can be realized a drive unit connecting system which is capable of connecting the drive unit to the host apparatus by using a general-purpose interface without employing expensive authentication-dedicated IC chips and which can make it impossible for the drive unit to operate normally when other improper apparatus is connected to the general-purpose interface. In other words, only the proper combination of a specific drive unit and a host apparatus incorporating a specific decoder unit allows the drive unit to operate normally. Besides, because the general-purpose interface is employed, there can be obtained such advantageous effect that functions (range of support commands and preset parameter, etc.) as well as performance (data transferring rate, prefetching/buffering rate, etc.) can be altered in dependence on the host apparatuses which are designed for connection with one and the same drive unit.

Furthermore, owing to the arrangement of the drive unit connecting system for connecting the DVD drive unit to the DVD reproducing apparatus by using the general-purpose interface, normal operation of the drive unit is rendered impossible when other improper apparatus is connected to the general-purpose interface without need for incorporating the expensive authentication-dedicated IC chips. To say in another way, only the proper combination of a specific DVD drive unit and a DVD reproducing apparatus incorporating a specific decoder unit can make the DVD drive unit operate normally. Additionally, because the general-purpose interface is employed, there can be obtained such effect that functions (range of support commands and preset parameter, etc.) as well as performance (data transferring rate, prefetching/buffering rate, etc.) can be altered in dependence on the DVD reproducing apparatuses (decoder unites) designed for connection with one and the same DVD drive unit.

Many features and advantages of the present invention are apparent from the detailed description and thus it is intended by the appended claims to cover all such features and advantages of the system which fall within the true spirit and scope of the invention. Further, since numerous modifications and combinations will readily occur to those skilled in the art, it is not intended to limit the invention to the exact construction and operation illustrated and described.

By way of example, the DVD drive unit 1 may be implemented in such a structure as to be electrically connectable by using a capable or alternatively mounted removably on the DVD reproducing apparatus 2.

Accordingly, all suitable modifications and equivalents may be resorted to, falling within the spirit and scope of the invention.

What is claimed is:

1. A drive unit connecting system for connecting a drive unit to a host apparatus by using a general-purpose interface, wherein said system is so arranged as to enable said drive unit to be connected to said host apparatus by performing software-based processing on either one of command(s) or parameter(s) or alternatively on both of the command(s) and the parameter(s), and said software-based processing performing can be changed at a desired time point.

2. A drive unit connecting system according to claim 1, wherein said desired time point is based on one of an absolute clock time and a driver version.

3. A drive unit connecting system for connecting a drive unit for an optical information/data recording medium to a reproducing apparatus by using a general-purpose interface, said drive unit comprising:
   a reading unit for reading information recorded on an optical information/data recording medium; and
   a drive controller for performing control such that video/audio data can be extracted from said information read out by said reading unit, said reproducing apparatus comprising:
   a work memory for storing the video/audio data supplied from said drive controller;
   a video/audio output unit for outputting video/audio data;
   a decoder unit for reading out the video/audio data stored in said work memory for converting said video/audio data read out into desired video/audio data to thereby output said desired video/audio data to said video/audio output unit; and
   a control unit for controlling said drive controller, said work memory and said decoder unit, wherein connection of said drive unit to said reproducing apparatus is enabled through software-based processing(s) performed on either command(s) or parameter(s) or alternatively on both of the command (s) and the parameter(s), and said software-based processing performing can be changed at a desired time point.

4. A drive unit connecting systems according to claim 3, wherein said desired time point is based on one of an absolute clock time and a driver version.

* * * * *